(12) United States Patent  
Denissen et al.

(10) Patent No.: US 7,827,500 B2
(45) Date of Patent: Nov. 2, 2010

(54) ENHANCED COMMAND LINE EXPANSION

(75) Inventors: Frank Lodewijk Denissen, Boom (BE); Hendrik Germain Van Hove, Boechout (BE); Werner Mario Liekens, Sint Katelijne Waver (BE)

(73) Assignee: Alcatel, Paris (FR)

( * ) Notice: Subject to any disclaimer, the term of this patent is extended or adjusted under 35 U.S.C. 154(b) by 1174 days.

(21) Appl. No.: 11/133,297

(22) Filed: May 20, 2005

(65) Prior Publication Data

US 2006/0259876 A1 Nov. 16, 2006

(30) Foreign Application Priority Data

May 12, 2005 (EP) ................................. 05291020

(51) Int. Cl.
*G06F 3/00* (2006.01)
(52) U.S. Cl. ...................... 715/764; 715/816
(58) Field of Classification Search ................. 715/816, 715/764

See application file for complete search history.

(56) References Cited

U.S. PATENT DOCUMENTS 4,209,784 A * 6/1980 Sumner et al. .............. 345/168
6,600,498 B1 * 7/2003 Chow .......................... 715/769

* cited by examiner

*Primary Examiner*—Kieu Vu
(74) *Attorney, Agent, or Firm*—Sughrue Mion, PLLC

(57) ABSTRACT

A method of expanding a command line comprising at least one command word and word separators delineating the at least one command word is presented. A trigger to expand the command line is detected, and upon detection of the trigger, a current cursor position within the command line is determined. From the current cursor position, a particular command word that is currently being edited is determined. The last characters of a particular command word is deleted from the cursor position onwards, thereby yielding a particular truncated command word. A match for the particular truncated command word is found in a command word database, and the particular truncated command is completed according to the match.

3 Claims, 2 Drawing Sheets

ENHANCED COMMAND LINE EXPANSION

The present invention relates to a method to expand a command line comprising at least one command word and word separators delineating said at least one command word, which method comprising the steps of:
- detecting a trigger to expand said command line,
- determining, upon detection of said trigger, a current cursor position within said command line,
- determining, from said current cursor position, a particular command word that is currently being edited.

BACKGROUND OF THE INVENTION

Command line terminals are of current use for controlling the operation of a computer (e.g., controlling the computer's configuration, accessing and controlling a file system, making network connections), of a chemical or manufacturing process, of a piece of equipment (e.g., a network unit), etc.

Command line expansion refers to expanding a command line that is partially typed in with a guess of what the operator is expected to enter next. Command line expansion is supported by most UNIX shell flavours, such as cshell, kshell, bash, etc, as well as by LINUX and Windows® operating systems.

These command expansion algorithms works fine provided the editing cursor is positioned at the end of the command line. Yet, if the operator starts overwriting partially an already typed in command, being in "inserting" mode or in "overwriting mode", e.g. for substituting a new command word for a former one, and next asks for expansion before the modification is completed, then the expansion does not work or is completely messed up, making such prior art solutions ineffective.

A common workaround is to overwrite the already typed in command until the modification is syntactically coherent, e.g. until the whole new command word is substituted, that is to say without even the need for further command expansion.

SUMMARY OF THE INVENTION

It is an object of the present invention to improve entering of command lines at a command line terminal.

According to the invention, this object is achieved due to the fact that said method comprises the steps of:
- deleting last characters of said particular command word located from said current cursor position onwards, thereby yielding a particular truncated command word,
- finding a match in a command word database for said particular truncated command word,
- completing said particular truncated command word according to said match, thereby yielding an expanded command line for execution by a command execution unit.

When expansion is requested in an already typed in command, then all the characters located between the current cursor position and the next word separator are removed first. The expansion is then done on the basis of the so-truncated word, and for that word only.

A method according to the invention is advantageous in that control via the command line terminal is improved.

Editing means that are usually inappropriate for editing a command line, such as a computer mouse, can now be endorsed for entering and modifying a command line, e.g. for pointing directly towards the command word that needs to be substituted, making this solution very ergonomic as it will be set forth further in the description.

The present invention also relates to a command line terminal comprising:
- an input unit for entering a command line comprising at least one command word and word separators delineating said at least one command word, which input unit being adapted to detect a trigger to expand said command line, and to determine, upon detection of said trigger, a current cursor position within said command line,
- a command preprocessing unit coupled to said input unit, and adapted to determine, from said current cursor position, a particular command word that is currently being edited,
- a command word database coupled to said command preprocessing unit.

A command line terminal according to the invention is characterized in that said command preprocessing unit is further adapted:
- to delete last characters of said particular command word located from said current cursor position onwards, thereby yielding a particular truncated command word,
- to find a match in said command word database for said particular truncated command word,
- to complete said particular truncated command word according to said match, thereby determining an expanded command line for execution by a command execution unit coupled to said command preprocessing unit.

The present invention also relates to a program product for use in a command line terminal comprising:
- an input function for entering a command line comprising at least one command word and word separators delineating said at least one command word, which input function being adapted to detect a trigger to expand said command line, and to determine, upon detection of said trigger, a current cursor position within said command line,
- a command preprocessing function coupled to said input function, and adapted to determine, from said current cursor position, a particular command word that is currently being edited,
- a command word database coupled to said command preprocessing function.

A program product according to the invention is characterized in that said command preprocessing function is further adapted:
- to delete last characters of said particular command word located from said current cursor position onwards, thereby yielding a particular truncated command word,
- to find a match in said command word database for said particular truncated command word,
- to complete said particular truncated command word according to said match, thereby yielding an expanded command line for execution by a command execution unit coupled to said command preprocessing unit.

Embodiments of a command line terminal according to the invention and embodiments of a program product according to the invention correspond with the embodiments of a method according to the invention.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The above and other objects and features of the invention will become more apparent and the invention itself will be best understood by referring to the following description of an embodiment taken in conjunction with the accompanying drawings wherein:

DETAILED DESCRIPTION OF EXEMPLARY EMBODIMENTS OF THE INVENTION

Figure 1:
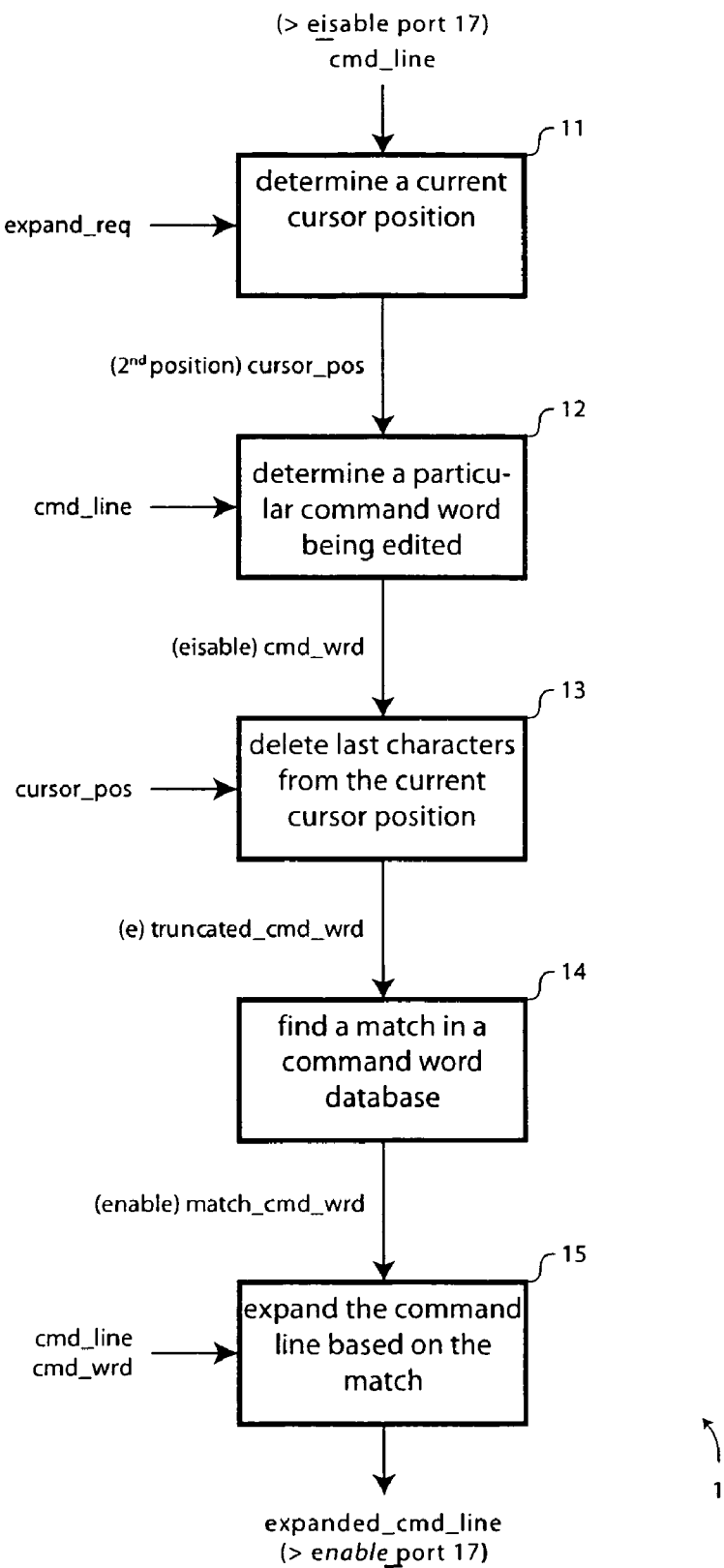
FIG. 1 represents a method to expand a command line according to the present invention.

There is seen in FIG. 1 a method 1 to expand a command line comprising 5 steps 11 to 15.

In a first step 11, a current position cursor_pos of an editing cursor within a command line cmd_line that is currently being edited is determined upon receipt of a trigger expand_req to expand the command line cmd_line.

For instance, an operator operating a network unit such as an IP router, or an access unit such as a Digital Subscriber Line Access Multiplexer (DSLAM), types in the following command line at a command line terminal coupled to the network unit or access unit:

">disable port $17_{13}$ ¶"

wherein

">" stands for the terminal prompt,

"_" stands for the current cursor position,

"¶" stands for the end of the line.

The command line may be retrieved from a history file too.

Let us assume the operator moves the cursor position over the character "d" of the command word "disable", and starts substituting the command word "enable" for the command word "disable". The operator overwrites the character "d" of "disable" with the character "e" of "enable", thereby yielding a updated command line "> eisable port 17¶", and asks for expansion by pushing a particular key (e.g., the <Tab> key) or by clicking a particular mouse button (e.g., the right mouse button).

Presently, the step 11 determines the current cursor position as being the $2^{nd}$ character position.

In a further step 12, a particular command word cmd_wrd that is currently being edited is determined. This is achieved by identifying word separators delineating the command words from each other. Examples of word separators are space character, tabular character, semi-column, beginning-of-line character (or terminal prompt), end-of-line character, etc.

Presently, the further step 12 looks for the immediately preceding and immediately following valid word separators within the command line ">eisable port 17¶", starting from the $2^{nd}$ position leftwards and rightwards respectively (or downwards and upwards depending on the writing direction that is in force), and identifies the command word "eisable" as being currently edited.

In a further step 13, the characters of the command word cmd_wrd located from the current cursor position rightwards are deleted (or leftwards or downwards or upwards depending on the writing direction that is in force), thereby yielding a truncated command word truncated_cmd_wrd.

Presently, the characters "isable" of the command word "eisable" are deleted, thereby yielding the truncated command word "e".

In a further step 14, a match match_cmd_wrd corresponding to the truncated command word truncated_cmd_wrd is looked for within a command word database. If there is more than one match then the common part thereof is identified, as is typically done in prior art systems.

Presently, the command word "enable" is identified as matching the truncated command word "e", and as being what the operator is expected to enter.

In a final step 15, the command line is expanded according to the match match_cmd_wrd, that is to say the particular command word cmd_wrd that is currently being edited is replaced by the command word match_cmd_word, thereby yielding an expanded command line expanded_cmd_line.

Presently, the command word "eisable" within the command line ">eisable port 17¶" is replaced by "enable", thereby yielding an expanded command line ">enable_port 17¶", wherein the expanded part has been italicized.

Figure 2:
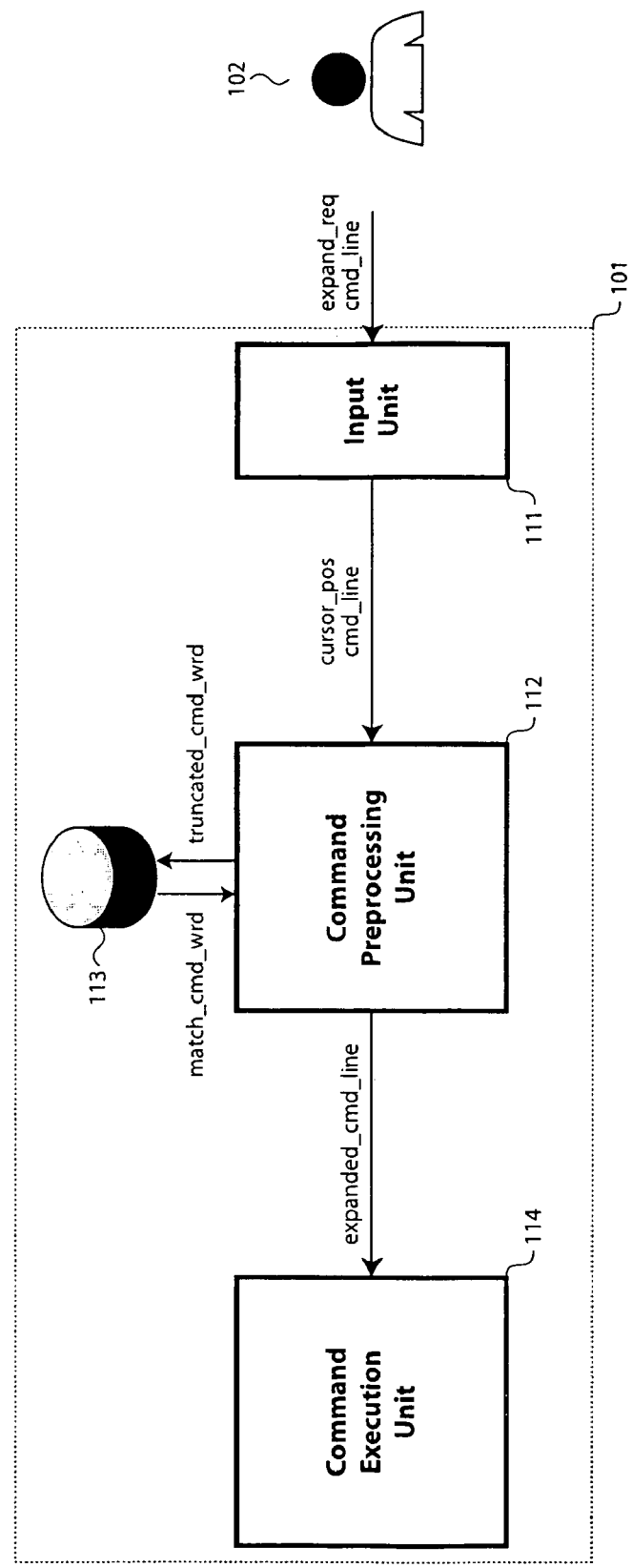
FIG. 2 represents a command line terminal according to the invention.

There is seen in FIG. 2 a command line terminal 101 operated by an operator 102, and comprising the following functional blocks:

an input unit 111,
a command preprocessing unit 112.
a command word database 113,
a command execution unit 114.

The command preprocessing unit 112 is coupled to the input unit 111, to the command word database 113 and to the command execution unit 114.

The command line terminal 101 is for instance a computer coupled to a keyboard, a mouse and a display monitor.

The input unit 111 is implemented by means of the keyboard and/or the mouse, including the corresponding software drivers for operation.

The command preprocessing unit 112 and the command execution unit 114 are implemented by means of one or more program product, pre-installed or coming as a separate package, running on a microprocessor, micro-controller or alike, together with the aforementioned drivers.

The command word database 113 is held in a non-volatile storage medium, being Read Only Memory (ROM), Erasable Programmable Read Only Memory (EPROM), Electrically Erasable Read Only Memory (EEPROM or E2PROM), flash memory, a magnetic disk such as a hard drive, an optical disk such a CD or DVD, etc.

The command word database 113 is then loaded into Random Access Memory (RAM) for immediate and easy access by the command preprocessing unit 112.

The input unit 111 is adapted to read the keys which the operator 102 presses, as well as to detect his mouse movements and actions (mouse click, mouse double-click, mouse hold-down, etc).

Upon detection of a particular trigger expand_req, the input unit 111 provides the command preprocessing unit 112 with the command line cmd_line that is currently being edited, together with the current position cursor_pos of the editing cursor within that command line.

The command preprocessing unit 112 is adapted to determine therefrom a particular command word cmd_wrd that is currently being edited, as it was set forth in the method 1, to delete the characters of the command word cmd_wrd located from the current cursor position cursor_pos rightwards, thereby yielding a truncated command word truncated_cmd_wrd, to find a match match_cmd_wrd in the command word database 113 for the truncated command word truncated_cmd_wrd, to expand the command line cmd_line according to the match match_cmd_wrd, thereby yielding an expanded command line expanded_cmd_line for execution by the command execution unit 114 (possibly after the command preprocessing unit 112 validates the syntax of the expanded command line expanded_cmd_line and/or the operator 102 acknowledges the command expansion).

The command execution unit 114 may form part of another equipment, in which case the command line terminal 101 is used for controlling the operation of that equipment.

As a first embodiment, the trigger expand_req is a particular key that is pushed, and the expanded command line is returned to the operator via the display as a new command line for further acknowledgment (e.g., by pressing the <Enter> key).

As a second embodiment, the operator points directly over the command word that needs to be replaced by moving the mouse, left-click, starts typing a few characters and then asks for expansion by holding down the right button of the mouse. All the command words that matches what he partially typed in are then displayed on-the-fly to the operator 102 as a context menu. The operator possibly scrolls through the list (the fewer letter, the more valid alternatives) and validates the expansion by selecting the right command word with a right-click.

It is to be noticed that if the operator points towards the beginning of a command word without entering any new character then he will be displayed the full list of available commands.

This embodiment is particularly advantageous in that it makes full use of existing pointing means, being a mouse, a roller-ball, a track pad, a joystick or alike, a drawing tablet, etc, thereby enhancing command line usage and providing the operator with full and fast control over the equipment operation.

The same invention may also apply to handheld devices, being mobile stations, camera recorders, Palm Pilot® agenda or alike, etc A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method to expand a command line (cmd_line) comprising at least one command word and word separators delineating said at least one command word, which method comprising the steps of:
   detecting of a trigger (expand_req) to expand said command line,
   determining, upon detection of said trigger, a current cursor position (cursor_pos) within said command line,
   determining, from said current cursor position, a particular command word (cmd_wrd) that is currently being edited, characterized in that said method comprises the steps of:
   deleting last characters of said particular command word located from said current cursor position onwards, thereby yielding a particular truncated command word (truncated_cmd_wrd),
   finding a match (match_cmd_wrd) in a command word database for said particular truncated command word,
   completing said particular truncated command word according to said match, thereby yielding an expanded command line (expanded_cmd_line) for execution by a command execution unit (114).

2. A command line terminal (101) comprising:
   an input unit (111) for entering a command line (cmd_line) comprising at least one command word and word separators delineating said at least one command word, which input unit being adapted to detect a trigger (expand_req) to expand said command line, and to determine, upon detection of said trigger, a current cursor position (cursor_pos) within said command line,
   a command preprocessing unit (112) coupled to said input unit, and adapted to determine, from said current cursor position, a particular command word (cmd_wrd) that is currently being edited,
   a command word database (113) coupled to said command preprocessing unit,
   characterized in that said command preprocessing unit is further adapted:
   to delete last characters of said particular command word located from said current cursor position onwards, thereby yielding a particular truncated command word (truncated_cmd_wrd),
   to find a match (match_cmd_wrd) in said command word database for said particular truncated command word,
   to complete said particular truncated command word according to said match, thereby determining an expanded command line
(expanded_cmd_line) for execution by a command execution unit (114) coupled to said command preprocessing unit.

3. A computer readable recording medium having embodied thereon a computer program for use in a command line terminal (101), the program comprising:
   an input function for entering a command line (cmd_line) comprising at least one command word and word separators delineating said at least one command word, which input function being adapted to detect a trigger (expand_req) to expand said command line, and to determine, upon detection of said trigger, a current cursor position (cursor_pos) within said command line,
   a command preprocessing function coupled to said input function, and adapted to determine, from said current cursor position, a particular command word (cmd_wrd) that is currently being edited,
   a command word database coupled to said command preprocessing function,
characterized in that said command preprocessing function is further adapted:
   to delete last characters of said particular command word located from said current cursor position onwards, thereby yielding a particular truncated command word (trunctade_cmd_wrd), to find a match (match_cmd_wrd) in said command word database for said particular truncated command word, to complete said particular truncated command word according to said match, thereby yielding an expanded command line (expanded_cmd_line) for execution by a command execution unit (114) coupled to said command preprocessing function.

* * * * *